Figure 1:
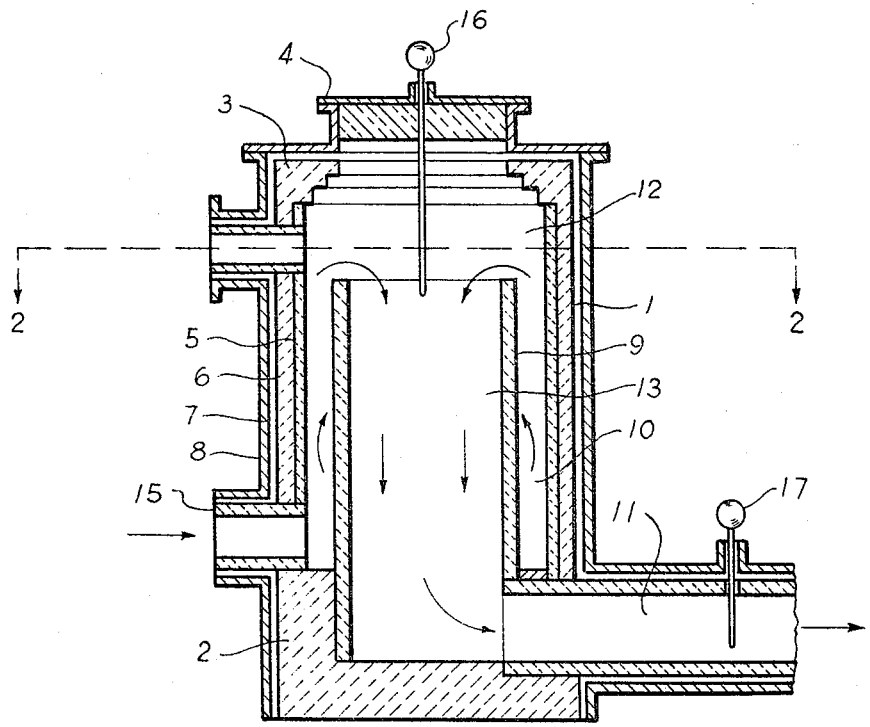

United States Patent Office 3,268,296
Patented August 23, 1966

3,268,296
PROCESS AND APPARATUS FOR TREATING
GAS STREAMS
Myron C. Hall, Buffalo, and Richard G. Woodland, Niagara Falls, N.Y., assignors to Hooker Chemical Corporation, Niagara Falls, N.Y., a corporation of New York
Filed Apr. 8, 1963, Ser. No. 271,375
11 Claims. (Cl. 23—154)

This invention relates to the treatment of gas streams to remove impurities therefrom, and more particularly relates to the treatment of gas streams resulting from the production of hydrogen halides.

In recent years, the problem of disposing of industrial waste gases has become increasingly significant. Many areas have ordinances which prohibit the release of such gases to the atmosphere unless they have been treated to remove toxic and/or objectionable substituents. The substituents to be removed from the industrial waste gases may be gaseous, liquid and solid, or may include materials in a plurality of these forms. In many instances, the procedure used for effective removal of these undesirable substituents will depend upon the physical form in which they are present in the waste gases. Accordingly, numerous and various methods have been employed to remove these contaminants from the waste gases.

Frequently, difficulties have been encountered in removing finely divided solid material from industrial waste gases. For example, solid impurities having a particle size of about 5 microns or less, such as "fly ash" and/or metal salts evolved in the burning of carbonaceous material, have proved to be particularly difficult to remove, economically, from waste gases. In order to obtain effective removal of such solid impurities from these gases, it has generally been necessary to utilize high efficiency air filters or electrostatic precipitators. Although both of these methods have been generally effective insofar as the efficient removal of the solid materials are concerned, neither is completely satisfactory. The high efficiency air filters generally require a relatively expensive filtering medium which must be replaced frequently to permit removal of the collected particles therefrom. During the time of this replacement, the treatment of the gas must either be interrupted or an alternate filter must be provided if a continuous purification operation is to be maintained. Additionally, as the solid particles build up on the filter media, an appreciable pressure drop is experienced across the filter. Although the electrostatic percipitators are not subject to this latter disadvantage, the initial cost of such equipment is appreciable. Additionally, the solid removal operation must be interrupted for removal of the collected particles from the precipitator or an alternate precipitator must be provided for use during the removal of the collective particles.

It is, therefore, an object of the present invention to provide an improved process for the removal of solid impurities having a particle size of less than about 5 microns from gases.

Another object of the present invention is to provide an improved process for removing solid impurities from gases, which process is carried out continuously without the necessity for the duplication of removal apparatus as has been heretofore required.

A further object of the present invention is to provide improved apparatus by means of which the present process may be carried out.

These and other objects will become apparent to those skilled in the art from the description of the invention which follows.

Figure 2:
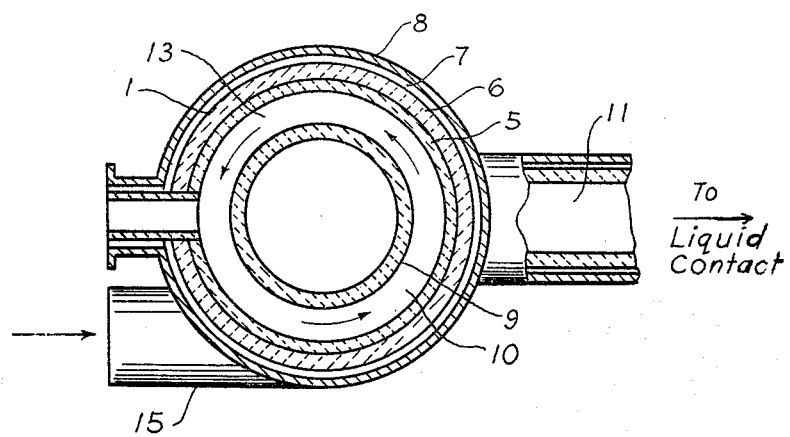
Figure 3:
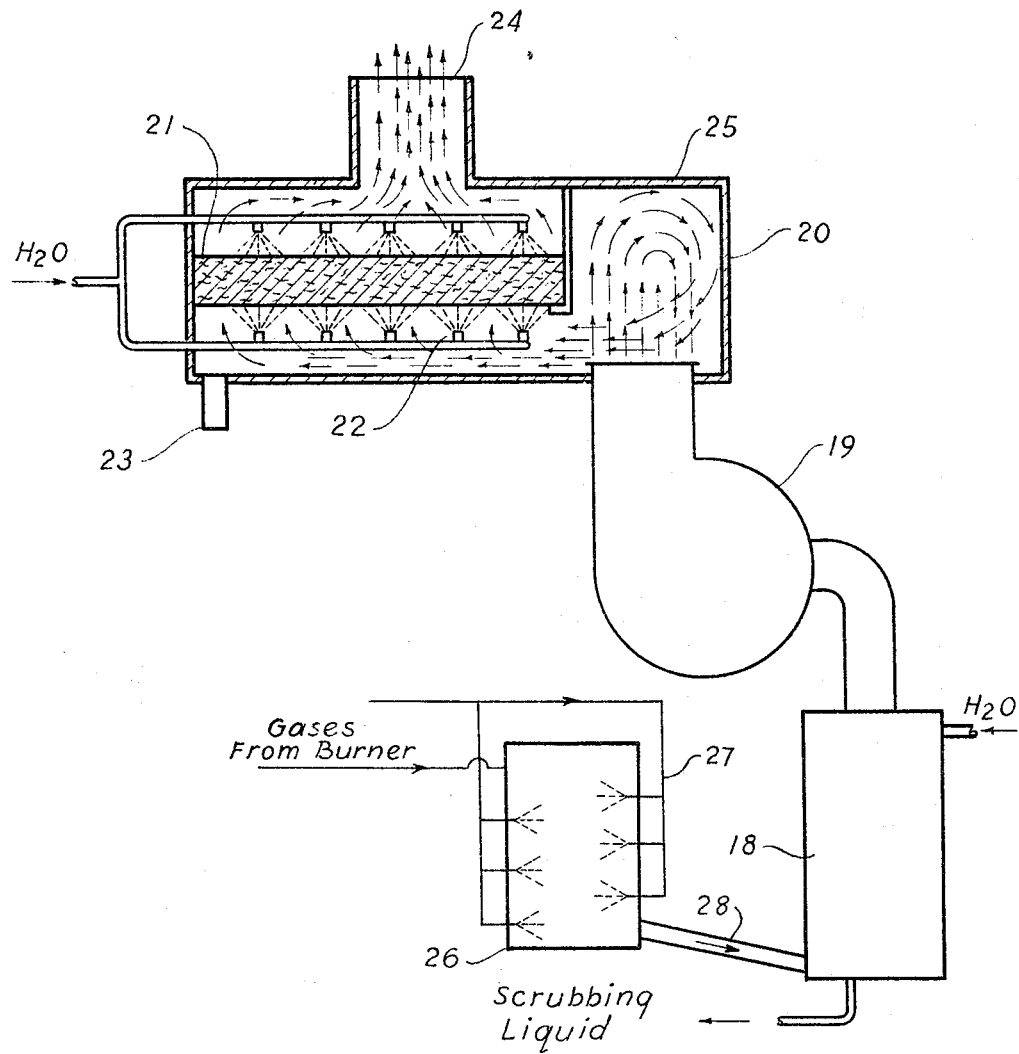

In the drawing, which is attached hereto and forms a part hereof, FIG. 1 is a vertical sectional view of a self-regenerative type furnace useful in producing the gases treated in the present method; FIG. 2 is a top sectional view of the furnace shown in FIG. 1; and FIG. 3 is a schematic representation of the improved gas purification system of the present invention.

In accordance with the above objects, the present process involves the treatment of a gas containing solid particles of a size not substantially in excess of about 5 microns and includes forming the solid particles in the gas into a liquid-solid aerosol having particles of the size in excess of about 5 microns, passing the gas containing the thus-formed aerosol through a foraminous material, the foramina of which are the size in excess of about 5 microns, effecting separation of the liquid-solid aerosol from the gas as it passes through the foraminous material, contacting the surface of the foraminous material with which the gas first comes in contact with a liquid medium, said contact preferably being concurrent with the flow of the gas, and contacting the surface of the foraminous material from which the gas exits after passing through the material with a second liquid medium, said contact preferably being countercurrent to the flow of the gas. By operating according to the above procedure, solid impurities are efficiently removed from the gas by an impingement type separator, which separator is not normally effective in removing solid particles, and particularly those of a size less than about 5 microns. Moreover, the above process operates continuously to remove the solid particles from the gas and there is no appreciable pressure drop across the separator device.

While the gases treated in accordance with the method of the present invention may be any gases containing finely divided solid impurities, it will be appreciated that the advantages of the process are best realized when the gas treated contains solid particles having a size not substantially in excess of about 5 microns. Exemplary of such gases are those resulting from the burning of carbonaceous materials, and particularly finely divided or non-solid carbonaceous materials. Such gases include those resulting from the combustion of finely divided or powdered coal, which gases contain appreciable amounts of so-called "fly ash," and are commonly produced in the production of steel. The method of the present invention has also been found to be particularly suitable for treating the combustion products resulting from the burning of halogenated organic materials in self-regenerative type furnaces. Such combustion products comprise carbon dioxide, hydrogen halide, and appreciable quantities of metal compounds such as iron chloride, and/or iron oxide, which latter materials are present in a very finely divided state, e.g., of a size less than about 5 microns, such as 0.1 micron, although larger particles may also be present and these need not be removed before processing the gas according to the present method. The process for producing such a combustion product, as well as a furnace used in the process are described in a copending application, S.N. 814,700, filed May 21, 1959, now U.S. Patent 3,140,155, issued July 7, 1964. By way of example, the process of the present invention will be described in relation to the treatment of such combustion gases obtained by the burning of halogenated organic materials.

More specifically, in the practice of the present invention, the gas containing solid particles of a size not substantially in excess of about 5 microns is treated so as to form the solid particles into a liquid-solid aerosol, having particles of the size in excess of about 5 microns. This treatment may be carried out in any convenient manner, utilizing any suitable gas-liquid contact means, such as gas scrubbers and/or absorbers. The contact between the gas and the liquid will be such that the formation of the desired liquid-solid aerosol in the gas is effected. Preferably, this is done by passing the gas into contact with finely divided liquid particles, as, for example, by passing the gas through a liquid spray zone. Where the gas being treated is the aforementioned combustion product of the halogenated organic materials and comprises hydrogen halides, it may also be desirable to absorb the hydrogen halide from the gas so that it may be recovered as a salable product. This may be done by passing the gas through an absorber, such as a packed column type absorber. Preferably, in treating such combustion gases, which may be at an elevated temperature of about 800 degrees centigrade, the gas is first passed through a direct contact cooler, wherein it is quickly cooled to about 100 degrees centigrade with the formation of the desired liquid-solid aerosol. Thereafter, the gas containing the thus-formed aerosol is passed through a packed tower absorber, wherein the hydrogen halide substituent of the gas is removed and formed into an aqueous solution of the hydrogen halide. It is to be appreciated that in forming the liquid-solid aerosol, it is believed that the minute solid particles may form a nucleus to which the liquid particles are tenaciously held. Additionally, however, coalescence of several solid particles with the water particles may also occur so that the present process is not to be limited to any specific physical form of the liquid-solid aerosol. Generally, the liquid used in the above liquid-gas contact operations will be water.

Once the liquid-solid aerosol has formed in the gas, and the solution of hydrogen halide separated from the gas, where this is desirable, the gas containing the liquid-solid aerosol is passed through a foraminous material, the foramina of which are of a size in excess of about 5 microns, and generally of a size of about 10 to 20 microns, or even as much as 100 microns. The foraminous material may be any material having openings of the desired size and is preferably a pad or bed of woven or knitted metallic or plastic filaments. Various filamentary materials may be used to make these woven or knitted mesh pads, as, e.g., stainless steel, nickel, aluminum, copper, brass, tantallum, nylon, polyethylene, polyesters, acrylic fibers, polytetrafluoroethylene fibers, fiberglass and the like. The fibrous material used to form the foraminous pad for use in the present method will, of course, depend upon the nature of the gas being treated. Where the gas is one obtained by the burning of halogenated organic material, excellent results have been obtained with a foraminous pad formed of knitted polyethylene fibers, and for this reason such a material is preferred in the present method.

In passing the gas, containing the liquid-solid aerosol, through the foraminous material, the particles of the aerosol, impinge upon the fibers of the foraminous material, and are coalesced on these fibers, thus separating them from the gas which passes through the foraminous material. In this manner, separation of the liquid-solid aerosol is achieved. As the gases pass through the foraminous material, the surface of the foraminous material with which the gas first comes in contact is contacted with the liquid medium, preferably directed concurrent with the flow of the gas. Similarly, the surface of the foraminous material from which the gas under treatment exits after passing through the material is also contacted with a liquid medium, this contact preferably being countercurrent to the flow of the gas. In this manner, a continuous removal of the entrained liquid-solid aerosol from the foraminous material is achieved, and there is no substantial build-up of these particles in the foraminous material. Any suitable liquid medium may be used for contacting the surfaces of the foraminous material, although for reasons of economy, water is preferred. Additionally, however, liquids such as dilute solutions of alkalis, such as sodium hydroxide, may also be used. The same or different liquid may be used for contacting the two surfaces of the foraminous material, although, again, for simplicity, it is preferred to use the same liquid to contact both surfaces. Where dilute solutions of caustic soda or similar alkalis are used to contact the surface of the foraminous material, it may be preferable to use these liquids only to contact the surface of the foraminous material with which the gas under treatment first comes into contact. It has been found that where dilute solutions of caustic soda are used to contact this latter surface of the foraminous material, no alkali is entrained in the gas which passes through the foraminous material. Where the surface of the foraminous material from which the gas exits is contacted with an alkali solution, however, some alkali may be entrained in the gas and it may be desirable to pass the gas through a second body of foraminous material in series with the first. For this reason, it is generally preferred where using alkali solutions to contact the foraminous material, that such solutions are used only to contact the surface of the material with which the gas first comes in contact, and that water be used to contact the surface of the foraminous material from which the gas exits.

The amount of liquid with which the foraminous material is contacted may be widely varied. The principal requirement is that sufficient liquid be used to effect a substantially continuous removal of the entrained particles of the liquid-solid aerosol from the foraminous material. The exact amounts of liquid used will, of course, depend upon the surface area of the foraminous material, as well as on the amount of solid-liquid aerosol in the gas being treated. Generally, large excesses of liquid, over and above that amount required for the substantially continuous removal of the entrained particles of the liquid-solid aerosol will not be used due to the added cost of handling such large volumes of liquid.

Considering now the drawing, FIG. 1 and FIG. 2 illustrate the furnace apparatus for producing the combustion gases treated in accordance with the methods of the present invention. In these figures, the furnace is shown as having an outer cylindrical fire wall 1, vertically positioned on a foundation 2, at the bottom, and covered at the top with refractory brick 3, and an insulated manhole cover 4, which serves as an explosion release means. The outer fire wall 1 is formed with a refractory material 5, on the inside, which has a low heat conductivity and which is resistant to free halogen, oxygen, and hydrogen halide, such as mullite, a composition of aluminum silicate. The refractory material is backed by fire brick 6 and an air gap 7, separates the fire brick from the gas-tight steel shell 8.

The furnace has an inner cylindrical fire wall 9, concentrically aligned with the outer fire wall 1, so that an annular space 10 is formed between the inner and outer walls. The inner fire wall 9 is positioned on the foundation 2, and is in communication at the bottom with an insulated outlet 11. This inner fire wall is in open communication with the top inner space 12 of the outer fire wall 1. Preferably, the inner fire wall 9 is constructed of a heat conductive refractory material such as silicon carbide brick so that there is an exchange of heat from the inside 13 of the inner wall cylinder through the refractory material to the annular space 10 between the inner and outer fire walls.

A feed inlet 14 is positioned in the outer fire wall 1. While this inlet may be intermediate the top and bottom of the inner fire wall 9, and formed at a downward angle and tangential to the cylindrical outer fire wall 1, it is preferably positioned horizontally above the inner fire wall 9, and is radial with respect to the outer fire wall 1. A second inlet 15 is positioned in the outer wall 1, preferably adjacent the bottom of the annular space 10, between the inner and outer walls. This inlet 15 is preferably located below the first inlet 14 and is tangential to the annular space 10. Additionally, a temperature indicating means 16 and 17 are positioned in the top inner space 12 by the outer wall 1 and the exit 11, respectively. Additionally, suitable nozzle means may be provided in the inlet 14 to effect the injection of the halogenated organic material into the combustion chamber. Such nozzle means are described in our copending application. The above-described furnace or burner and its operation are described in detail in a copending application S.N. 814,700, filed May 21, 1959, now U.S. Patent 3,140,155, issued July 7, 1964.

The combustion products produced by the burning of the halogenated organic materials in the furnace pass through the insulated outlet 11, to the direct contact cooler and related apparatus as shown in FIG. 3. In this figure, the water contact apparatus is shown as being made up of two portions, a direct contact cooler 26 and an absorber 18. The cooler 26 is provided with an inlet at the top, through which the gases from the burner are introduced, water spray means 27 and an outlet 28 at the bottom. This outlet 28 is in communication with the bottom of the absorber 18, which is provided with an inlet at the top, through which water is introduced to contact the gases. The absorber 18 is operatively connected to a draft fan 19, or other suitable means for effecting removal of the gases from the liquid contact chamber. The draft fan 19 is in communication with the structure 20 containing the apparatus for removing the solids from the gas so that the gas is withdrawn by the draft fan 19 from the absorber 18 and directed into the interior of this structure.

Within the structure 20, a body of a foraminous material as a bed or pad 21, is positioned so that the gases introduced into the structure 20 will pass through this pad 21 to the gas outlet 24 of the structure. Spray nozzles 22 are positioned above and below the pad 21 so that water or other liquid may be directed through suitable piping to the nozzles to be sprayed on the upper and lower surfaces of the pad. A liquid outlet 23 is provided at one end of the structure 20, so that the liquids contacting the pad 21 may be removed from the interior of the structure 20. Preferably, the bottom of the structure 20 is sloped toward this outlet to aid in the removal of the liquids. The structure 20 is further provided with an open portion 25 into which the gases from the draft fan 19 are initially directed. This open area serves to equalize the pressure of the gas within the structure so that a more even gas flow through the foraminous pad 21 is obtained. It will be appreciated that other means of effecting this pressure equalization may be used, as, e.g., by introducing the gases from the draft fan 19 into the side of the structure 20 rather than the bottom.

In the operation of this apparatus, a suitable halogenated organic material is injected into the inlet 14 into the annular combustion chamber 10 of the furnace. These halogenated organic materials are those which are normally difficult or impossible to decompose completely in ordinary waste disposal incinerators. Exemplary of such materials are hexachlorocyclopentadiene, hexachlorobutadiene, octachlorocyclopentene, heptachlorocyclopentene, benzene hexachloride, trichlorobenzenes, the tetrachlorobenzenes, the trichlorophenols, pentachlorophenol, monochlorotoluene, monochlorobenzyl chloride, chlorobenzoyl chlorides, chlorinated aliphatic acids, sulfur-containing chlorinated organics, such as chlorinated thiophenes and thiophene oxides, chlorinated lower aliphatics, such as carbon tetrachloride, chloroform, trichloroethylene, perchloroethylene, hexachloroethane, tetrachloroethane, and the like, as well as the fluorinated, brominated and iodinated analogs of the above. These residual materials frequently contain appreciable amounts of iron and/or other metallic contaminants. Along with the halogenated organic material, amounts of a hydrogen source, such as steam, and amounts of an oxygen source, such as air, sufficient to provide for the hydrogen and oxygen requirements of the combustion are also introduced into the annular combustion chamber 10, through the inlet 14 and/or the inlet 15.

The combustion zone 10 of the furnace is maintained at a suitable high temperature to effect combustion of the halogenated organic material as it is injected into the furnace. Generally, this temperature will be within the range of about 900 to about 1300 degrees centigrade, although higher or lower temperatures may also be used, depending upon the temperature at which combustion of the halogenated organic material takes place. The combustion products resulting from the burning of this halogenated organic material pass around the annular combustion chamber 10 and are drawn upwardly into the top space 12 of the furnace and then down through the inner chamber 13 to the outlet 11 from which is withdrawn the combustion product comprising carbon dioxide, hydrogen halide, and solid particles of iron chloride and/or oxide.

From the outlet 11 of the furnace, the combustion gases are directed into the top of the direct contact cooler 26 wherein they are brought into contact with a water spray introduced into the apparatus through the spray means 27. As a result of this contact, the gas is cooled and the solid particles of iron chloride and/or oxide are formed into a water-solid aerosol. The gas is then passed through the outlet 28 into the bottom of the absorber 18 wherein it is brought into countercurrent contact with water introduced into the top of the absorber. Within the absorber 18, the hydrogen halide in the combustion gas is absorbed in the water and removed from the bottom of the apparatus as an aqueous solution. Substantially all of the water-solid aerosol, however, remains suspended in the gas. From the absorber 18, the gas containing the water-solid aerosol is removed by means of the draft fan 19 and discharged into the solids removing apparatus 20. The gases are injected into section 25 of this apparatus so that the pressure of the gas is substantially equalized by the turbulent flow of the gas as it passes from this section 25 through the pad of foraminous material 21. The gas in passing through the pad 21 to the outlet 24 has substantially all of the water-solid aerosol removed by impingement on the fibers of the foraminous pad. Water is sprayed on the top and bottom surfaces of the pad 21 through the nozzles 22 so that there is a substantially continuous removal of the impinged liquid-solid aerosol from the pad. This water, containing the solid particles removed from the foraminous pad 21, flows through the pad to the bottom of the container 20, where it is removed through the outlet 23. In this manner, substantially all of the solid particles are removed from the gas and it can be safely vented to the atmosphere through the outlet 24 with substantially no danger of contaminating either the atmosphere or the area surrounding the apparatus.

In actual operation, a furnace constructed in the manner shown in FIG. 1 and FIG. 2, having an inside volume of about 60 cubic feet, and a mixer nozzle assembly in the inlet 14 as described in our copending application, S.N. 267,679, filed March 25, 1963, was preheated to a temperature of about 900 degrees centigrade. The halogenated organic material was then metered into the inlet 14 of the furnace at a rate of about 425 pounds per hour. The halogenated organic material was comprised of substantial quantities of the following materials: $CCl_4$, $C_2Cl_4$, $C_2Cl_6$, $C_4Cl_6$, $C_5Cl_8$, and $C_6Cl_6$, as well as appreciable amounts of iron impurities. The overall average composition of this feed material is about 20 percent carbon and about 80 percent chlorine. Steam, at the rate of about 300 to 500 pounds per hour at a pressure of about 70 pounds per square inch (gauge), was also added to the mixer nozzle assembly and the inlet 14 and air, at the rate of about 660 pounds per hour, was added to the combustion zone 10 of the furnace, a portion of the air being added to the mixer nozzle assembly in the inlet 14, with the remainder being introduced through the inlet 15. Within the furnace, the halogenated organic material was substantially completely burned and the exit gases from the outlet 11 were found to be comprised of about 350 pounds per hour of hydrogen chloride, 311 pounds per hour of carbon dioxide, 507 pounds per hour of nitrogen, and the balance steam and oxygen with traces of carbon monoxide. Additionally, appreciable quantities of iron chloride and/or iron oxide in very finely divided form, having a particle size not in excess of about 5 microns were also present in the exit gas. From the outlet 11, this gaseous combustion product at a temperature of about 800 degrees centigrade, was introduced into the top of the direct contact cooler 26, and therein was contacted with a water spray introduced into the apparatus at the rate of about 9,000 gallons per hour. The contact of the gas with the spray cooled the gas to about 100 degrees centigrade in a period of about one second and effected formation of the iron chloride and/or oxide particles in the gas into a water-solid aerosol having particles of a size in excess of about 5 microns. From the cooler 26, the gas containing the aerosol was passed through the outlet 28 into the bottom of the absorber 18, wherein it was countercurrently contacted with water introduced into the top of the absorber at the rate of about 18,000 gallons per hour. The hydrogen chloride in the gas was absorbed in the water and recovered from the bottom of the apparatus, while the iron chloride and/or oxide particles as the water-solid aerosol remained in the gas. The gas containing this water-solid aerosol was then passed into the chamber 25 of the apparatus 20, from which it passed upwardly through the foraminous pad 21 to the outlet 24. Water, at a total rate of about 720 gallons per hour was sprayed on the upper and lower surfaces of the foraminous pad 21, the flow being split about equally between the surfaces, so that the solid particles, removed from the gas as it passed through the pad, were washed down, substantially continuously and removed through the outlet 23 in the bottom of the container 20. The gas passing through the outlet 24 was found to be comprised of nitrogen, carbon dioxide, with trace amounts of carbon monoxide, and water vapor, and was substantially free of hydrogen chloride and solid particles of iron chloride and/or oxide.

It will be appreciated although primary reference has been made hereinabove to the treatment of chlorinated organic materials, the process and apparatus of the present invention may be used in treating organic materials containing bromine, fluorine or iodine substituents as well. In these instances, of course, the apparatus will be constructed of materials which will withstand the feed materials used and the products of combustion. Similarly, it is to be understood that although the process and apparatus have been described with relation to the treatment of halogenated organic materials, they can also be used in treating other gases containing finely divided solid impurities.

While there have been described various embodiments of the invention, the methods and apparatus described are not intended to be understood as limiting the scope of the invention, as it is realized that changes therewithin are possible, and it is further intended that each element recited in the following claims, it to be understood as referring to all equivalent elements for accomplishing the same results in substantially the same or equivalent manner, it being intended to cover the invention broadly in whatever form its principle may be utilized.

What is claimed is:

1. A process for treating a gas containing solid particles of a size not substantially in excess of about 5 microns which comprises forming the solid particles in the gas into a liquid-solid aerosol, having particles of a size in excess of about 5 microns, passing the gas containing the thus-formed aerosol through a foraminous material, the foramina of which are of a size in excess of about 5 microns, but not in excess of 100 microns, effecting separation of the liquid-solid aerosol from the gas as it passes through the foraminous material, contacting the surface of the foraminous material with which the gas first comes in contact with a flowing liquid medium, and contacting the surface of the foraminous material from which the gas exits after passing through the material with a second flowing liquid medium, said second contact being countercurrent to the flow of the gas.

2. The process as claimed in claim 1 wherein the liquid-solid aerosol is formed by contacting the gas containing the solid particles with a liquid spray.

3. The process as claimed in claim 1 wherein the liquid with which the liquid-solid aerosol is formed and the liquid with which the foraminous material is contacted is water.

4. The process as claimed in claim 2 wherein the liquid with which the liquid-solid aerosol is formed and the liquid with which the foraminous material is contacted is water.

5. In a process wherein a halogenated organic material, a hydrogen source and an oxygen source are introduced into a furnace maintained at a temperature above that required to effect substantially complete combustion of the halogenated organic material, and there is produced a product of combustion comprising carbon dioxide, hydrogen halide, and appreciable quantities of suspended solid matter, having a particle size not substantially in excess of about 5 microns, the improvement which comprises forming the suspended solid matter in the gaseous combustion product into a liquid-solid aerosol, having particles of the size in excess of about 5 microns, passing the gas containing the thus-formed aerosol through a foraminous material, the foramina of which are the size in excess of about 5 microns, but not in excess of 100 microns, effecting separation of the liquid-solid aerosol from the gas as it passes through the foraminous material, by contacting the surface of the foraminous material with which the gas first comes in contact with a flowing liquid medium, said contact being concurrent with the flow of the gas, and contacting the surface of the foraminous material from which the gas exits after passing through the material with a second flowing liquid medium, said latter contact being countercurrent to the flow of the gas.

6. The process as claimed in claim 5 wherein the liquid-solid aerosol is formed by contacting the gaseous combustion products containing the suspended solid matter with a liquid spray.

7. The process as claimed in claim 5 wherein the liquid with which the liquid-solid aerosol is formed and the liquid with which the foraminous material is contacted is water.

8. The process as claimed in claim 6 wherein the liquid with which the liquid-solid aerosol is formed and the liquid with which the foraminous material is contacted is water.

9. In a process wherein a halogenated organic material, a hydrogen source, and an oxygen source are introduced into a furnace maintained at a temperature above that required to effect substantially complete combustion of the halogenated organic material and there is produced in the furnace a gaseous combustion product comprising carbon dioxide, hydrogen halide and suspended solid matter having a particle size not substantially in excess of about 5 microns, the improvement which comprises passing the gaseous combustion product containing the suspended solid matter in contact with a water spray, whereby the suspended solids in the gas are formed into a water-solid aerosol, having particles of a size in excess of about 5 microns, subsequently passing the gas containing the aerosol in countercurrent contact with water, whereby an aqueous solution of the hydrogen halide is formed, separating the thus-formed aqueous solution of the hydrogen halide from the gas with substantially no separation of the aerosol from the gas, passing the gas containing the water-solid aerosol particles through a foraminous material, the foramina of which are of a size in excess of about 5 microns, but not in excess of 100 microns separating the water-solid aerosol from the gas as it passes through the foraminous material contacting the surface of the foraminous material with which the gas first comes in contact with water, said contact being concurrent with the flow of the gas, and contacting the surface of the foraminous material from which the gas exits after passing through the material with water, said contact being countercurrent to the flow of the gas, whereby a gas is obtained which is substantially free of hydrogen halide and suspended solid matter.

10. In an apparatus capable of converting halogenated organic material into a product comprising carbon dioxide, hydrogen halide and suspended solid materials, having a particle size not substantially in excess of 5 microns, which includes a furnace means having an inner and outer cylindrical fire wall spaced apart to form an annular combustion zone therebetween, an inlet to the combustion zone through the outer fire wall, and an outlet means through which the gaseous combustion product is obtained, the improvement which comprises a gas cooling apparatus in communication with the outlet means, means for passing the gaseous combustion product from said outlet means through the cooling apparatus, in direct contact with a water spray, whereby the suspended solid materials in the gas are formed into a water-soluble aerosol having particles of a size in excess of about 5 microns, a gas absorber means, means for passing the gases from the cooling apparatus through the absorber means in countercurrent contact with water, whereby an aqueous solution of the hydrogen halide in the gas is formed, means for removing the aqueous solution of the hydrogen halide from the absorber means, fan means for withdrawing the gas containing the water-solid aerosol particles from the absorber means, a body of foraminous material, having foramina of a size in excess of about 5 microns, but not in excess of 100 microns, positioned so that the gas containing the liquid-solid aerosol removed from the absorber means may be passed therethrough, said body of foraminous material being formed so as to have two oppositely disposed, substantially flat, parallel surfaces, said body of foraminous material being positioned so that said flat surfaces are substantially perpendicular to the direction of the flow of the gas, means for passing the gas upwardly through the body of the foraminous material, whereby the water-solid aerosol is separated from the gas, spray means for contacting the lower said flat surface of the body of foraminous material with water in a direction substantially concurrent with the gas flow, spray means for contacting the upper said flat surface of the body of foraminous material with water in a direction substantially concurrent with the direction of the gas flow whereby there is obtained a gas which is substantially free from hydrogen halide and suspended solid particles.

11. Apparatus for the treatment of halogenated organic material which comprises furnace means comprising an outer cylindrical fire wall vertically positioned on a foundation at the bottom and covered at the top, an inner cylindrical heat conductive fire wall concentrically aligned with the outer fire wall to form an annular space between the two fire walls, said inner fire wall positioned on the foundation and in direct communication with outlet means at the bottom, through which a gaseous combustion product comprising carbon dioxide, hydrogen halide and suspended solid matter having a particle size not substantially in excess of about 5 microns is obtained, and in open communication with the top inner space of the outer fire wall, a first feed inlet means positioned in the side of the outer fire wall such that the feed materials are injected radially and substantially horizontally, a second inlet means positioned in the side of the outer fire wall near the foundation for injecting gases which are required for combustion therein to preheat the surface of the furnace and to regulate the composition of the combustion product, a gas cooling apparatus in communication with the outlet means, means for passing the gaseous combustion product from said outlet means through the gas cooling apparatus, in direct contact with a water spray, whereby the suspended solid materials in the gas are formed into a water-soluble aerosol having particles of a size in excess of about 5 microns, a gas absorber means, means for passing the gases from the cooling apparatus through the absorber means in countercurrent contact with water, whereby an aqueous solution of the hydrogen halide in the gas is formed, means for removing the aqueous solution of hydrogen halide from the absorber means, fan means for withdrawing the gas containing the water-solid aerosol particles from the absorber means, a body of foraminous material, having foramina of a size in excess of about 5 microns, but not in excess of 100 microns, positioned so that the gas containing the liquid-solid aerosol removed from the absorber means may be passed therethrough, said body of foraminous material being formed so as to have two oppositely disposed, substantially flat, parallel surfaces, said body of foraminous material being positioned so that said flat surfaces are substantially perpendicular to the direction of the flow of the gas, means for passing the gas upwardly through the body of the foraminous material, whereby the water-solid aerosol is separated from the gas, spray means for contacting the lower said flat surface of the body of faraminous material with water in a direction substantially concurrent with the gas flow, spray means for contacting the upper said flat surface of the body of foraminous material with water in a direction substantially concurrent with the direction of the gas flow whereby there is obtained a gas which is substantially free from hydrogen halide and suspended solid particles.

References Cited by the Examiner

UNITED STATES PATENTS

| | | |
|---|---|---|
| 1,379,056 | 5/1921 | Smith. |
| 2,282,712 | 5/1942 | Engs et al. _____ 23—154 X |
| 2,384,368 | 9/1945 | Crouch et al. _____ 23—219 |
| 2,819,887 | 1/1958 | Eversole et al. _____ 261—94 |
| 2,877,717 | 3/1959 | Reed _____ 23—259.5 |
| 3,050,919 | 8/1962 | Tailor _____ 261—118 X |
| 3,079,231 | 2/1963 | Draper et al. _____ 23—154 |
| 3,085,860 | 4/1963 | Jacobowsky et al. _____ 23—154 |
| 3,107,986 | 10/1963 | Plant et al. _____ 55—97 |
| 3,130,008 | 4/1964 | Stokes _____ 23—154 |
| 3,140,155 | 7/1964 | Cull et al. _____ 23—277 |
| 3,179,497 | 4/1965 | Yanagase _____ 23—227 |

FOREIGN PATENTS 640,444    7/1950   Great Britain.

REUBEN FRIEDMAN, *Primary Examiner.*

B. NOZICK, *Assistant Examiner.*